(12) United States Patent
Gaudreau, Jr. et al.

(10) Patent No.: US 8,579,369 B2
(45) Date of Patent: Nov. 12, 2013

(54) TRUSS SYSTEM FOR JUVENILE VEHICLE SEAT

(75) Inventors: Paul D. Gaudreau, Jr., Indianapolis, IN (US); David Amirault, Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 458 days.

(21) Appl. No.: 12/912,480

(22) Filed: Oct. 26, 2010

(65) Prior Publication Data

US 2012/0098309 A1    Apr. 26, 2012

(51) Int. Cl.
*B60N 2/42* (2006.01)
*B60N 2/26* (2006.01)
*B60N 2/28* (2006.01)
*B60R 22/10* (2006.01)

(52) U.S. Cl.
USPC .................................. 297/216.11; 297/250.1

(58) Field of Classification Search
USPC .............................. 297/216.11, 250.1–256.16
See application file for complete search history.

(56) References Cited

U.S. PATENT DOCUMENTS

| | | | |
|---|---|---|---|
| 3,992,056 A | | 11/1976 | Koziatek et al. |
| 4,033,622 A | * | 7/1977 | Boudreau ................. 297/256.13 |
| 4,183,580 A | | 1/1980 | Johansson |
| 4,613,188 A | | 9/1986 | Tsuge et al. |
| 4,632,456 A | | 12/1986 | Kassai |
| 5,082,325 A | | 1/1992 | Sedlack |
| 5,366,271 A | | 11/1994 | Johnston et al. |
| 5,449,216 A | * | 9/1995 | Gierman et al. ......... 297/216.11 |
| 5,468,044 A | * | 11/1995 | Coman .................... 297/216.11 |
| 5,468,046 A | | 11/1995 | Weber et al. |
| 5,639,144 A | * | 6/1997 | Naujokas ............. 297/216.11 X |
| 6,338,529 B1 | * | 1/2002 | David et al. ................ 297/250.1 |
| 6,386,632 B1 | * | 5/2002 | Goor et al. ............... 297/216.11 |
| 6,398,302 B1 | | 6/2002 | Freedman et al. |
| 6,679,550 B2 | * | 1/2004 | Goor et al. ............... 297/216.11 |
| 6,764,135 B2 | | 7/2004 | Sasaki et al. |
| 6,808,232 B2 | | 10/2004 | Takizawa |
| 6,817,673 B2 | | 11/2004 | Walker et al. |
| 7,086,695 B2 | * | 8/2006 | Hosoya .................... 297/256.16 |
| 7,246,854 B2 | | 7/2007 | Dingman et al. |
| 7,344,192 B2 | | 3/2008 | Kespohl |
| 7,380,878 B2 | | 6/2008 | Clement et al. |
| 7,467,824 B2 | * | 12/2008 | Nakhla et al. ............ 297/216.11 |
| 7,472,952 B2 | | 1/2009 | Nakhla et al. |
| 7,475,941 B2 | | 1/2009 | Clement et al. |
| 7,484,801 B2 | * | 2/2009 | Kassai et al. ............. 297/256.16 |
| 8,186,757 B2 | * | 5/2012 | Duncan et al. ........... 297/256.13 |
| 8,393,674 B2 | * | 3/2013 | Keegan et al. ........... 297/216.11 |
| 8,474,907 B2 | * | 7/2013 | Weber et al. ............. 297/256.16 |
| 2005/0110315 A1 | | 5/2005 | Littlehorn et al. |
| 2006/0006712 A1 | | 1/2006 | Clement et al. |
| 2006/0163923 A1 | * | 7/2006 | Baumann et al. ............. 297/254 |
| 2009/0200842 A1 | | 8/2009 | Goldberg et al. |
| 2012/0098304 A1 | * | 4/2012 | Gaudreau, Jr. ........... 297/216.11 |
| 2012/0098309 A1 | * | 4/2012 | Gaudreau et al. ...... 297/250.1 X |
| 2012/0146369 A1 | * | 6/2012 | Gaudreau, Jr. ........... 297/216.11 |
| 2012/0153690 A1 | * | 6/2012 | Gaudreau, Jr. ............. 297/250.1 |
| 2012/0175921 A1 | * | 7/2012 | Gaudreau, Jr. ....... 297/256.11 X |
| 2012/0306243 A1 | * | 12/2012 | Oltman et al. ........... 297/216.11 |

\* cited by examiner

*Primary Examiner* — Rodney B White
(74) *Attorney, Agent, or Firm* — Barnes & Thornburg LLP

(57) ABSTRACT

A child restraint includes a juvenile seat and a child-restraint harness coupled to the juvenile seat. The juvenile seat includes a seat shell formed to include a seat bottom and a seat back extending upwardly from the seat bottom. The juvenile seat also includes a headrest mounted for up-and-down movement on the seat back.

32 Claims, 8 Drawing Sheets

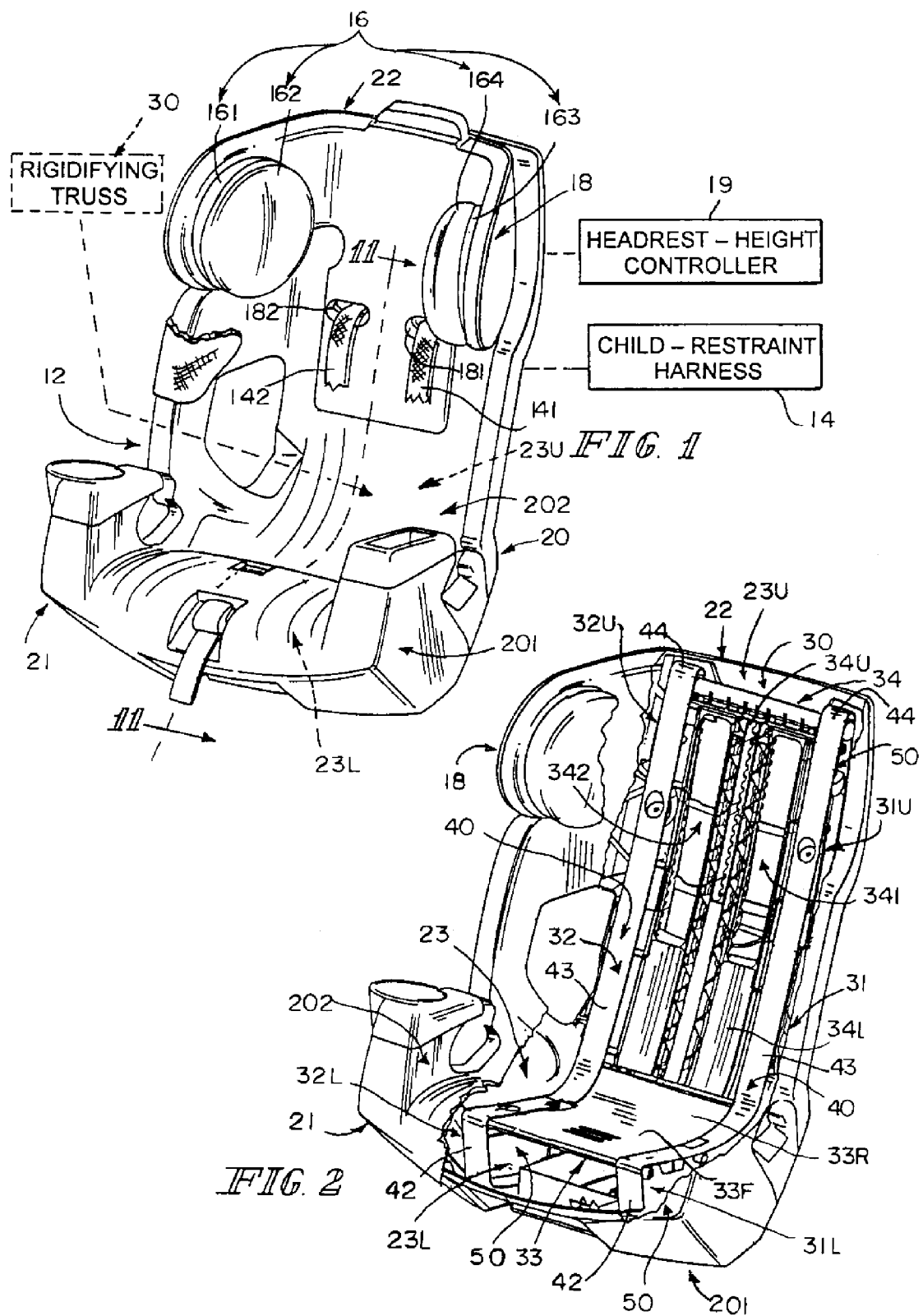

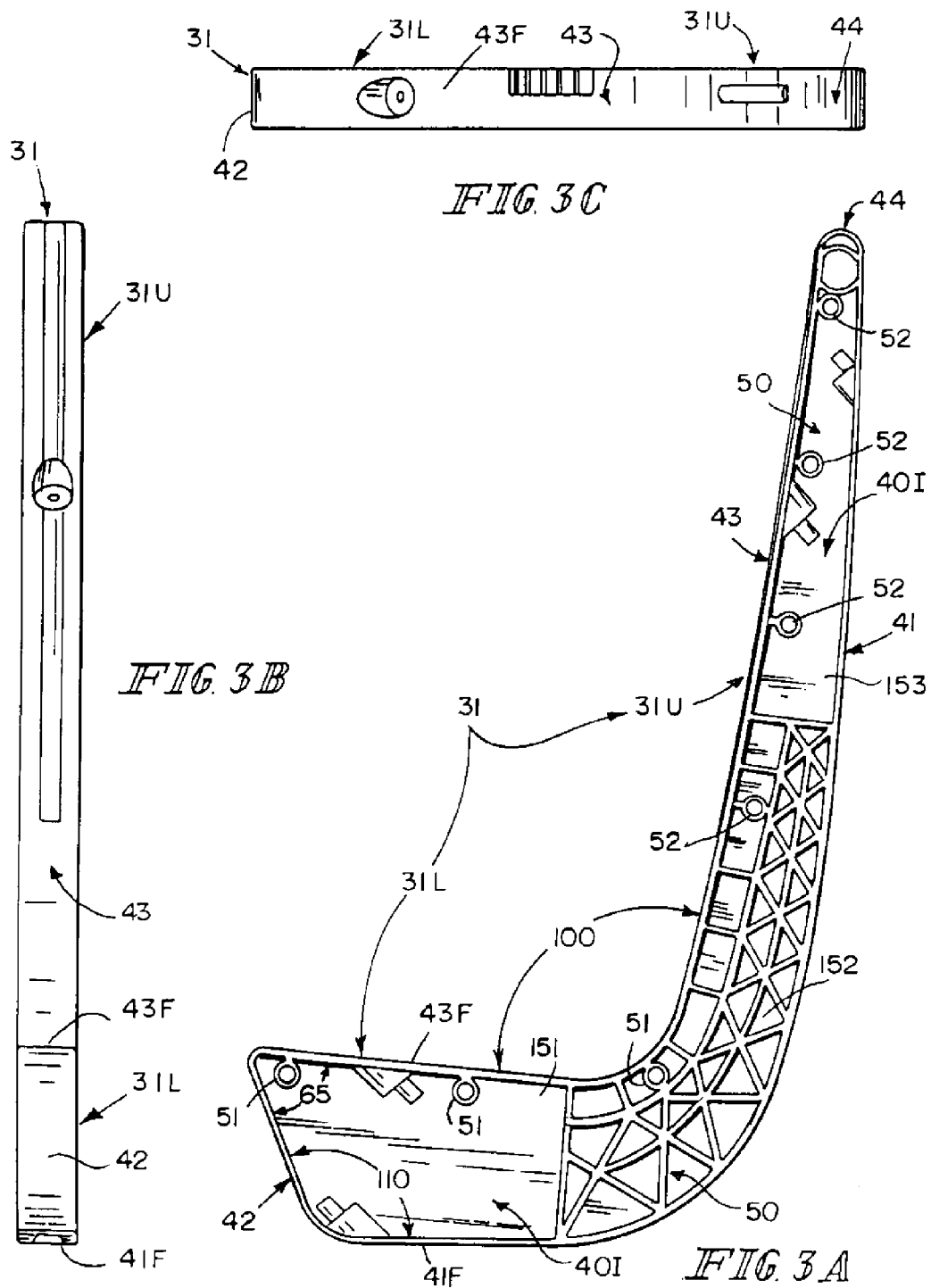

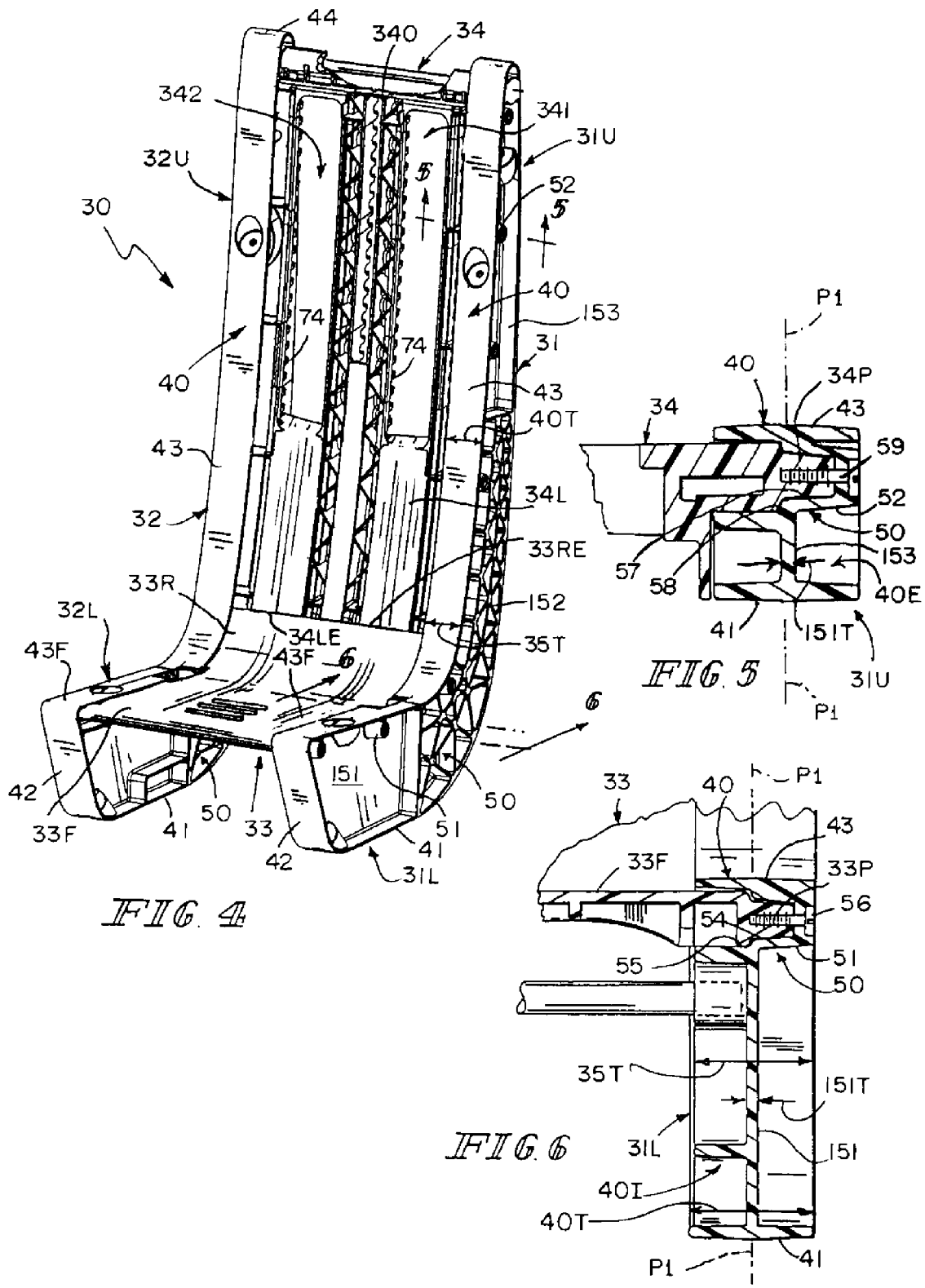

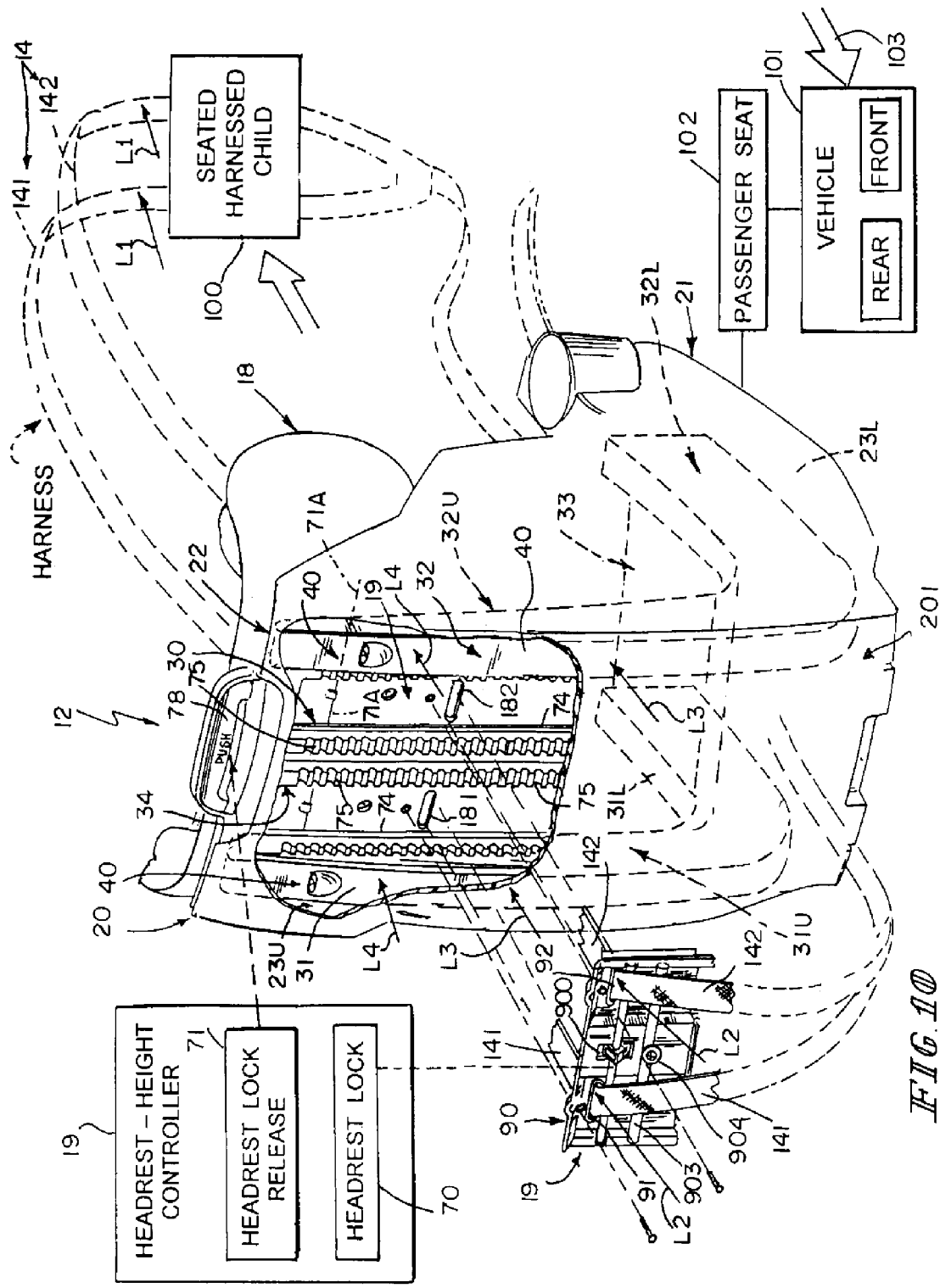

under a headrest of the hollow seat shell

TRUSS SYSTEM FOR JUVENILE VEHICLE SEAT

BACKGROUND

The present disclosure relates to child restraints, and in particular, to juvenile seats for use on passenger seats in vehicles. More particularly, the present disclosure relates to rigidifying structures included in juvenile seats.

SUMMARY

According to the present disclosure, a child restraint includes a juvenile seat and a child-restraint harness coupled to the juvenile seat. The juvenile seat includes a seat shell formed to include a seat bottom and a seat back extending upwardly from the seat bottom.

In illustrative embodiments, the seat shell is hollow and the juvenile seat also includes a rigidifying truss coupled to the hollow seat shell. The seat back cooperates with the seat bottom to define an interior region of the hollow seat shell. The rigidifying truss is located in the interior region of the hollow seat shell and coupled to the seat bottom and to the seat back to lie in a stationary position in the interior region.

The rigidifying truss includes a first stiffener beam, a second stiffener beam, a lower stabilizer beam, and an upper stabilizer beam. The second stiffener beam is arranged to lie in laterally spaced-apart relation to the first stiffener beam. The lower beam stabilizer is located in a bottom cavity of the interior region formed in the seat bottom and arranged to interconnect lower portions of the first and second stiffener beams to retain those lower portions in fixed relation to one another. The upper beam stabilizer is located in a back cavity of the interior region formed in the seat back to communicate with the bottom cavity and arranged to interconnect upper portions of the first and second stiffener beams to retain those upper portions in fixed relation to one another and to the lower portions of the first and second stiffener beams.

In illustrative embodiments, each of the first and second stiffener beams is substantially J-shaped to resemble a hockey stick. The lower portion of each stiffener beam is arranged to lie in the bottom cavity. The upper portion of each stiffener beam is arranged to lie in the back cavity. The lower portion of each of the first and second stiffener beams is a forwardly and generally horizontally extending blade having an inwardly facing side edge mating with an outwardly facing edge of the lower beam stabilizer. The upper portion of each of the first and second stiffener beams is an upwardly extending handle coupled to a rear end of a companion blade and arranged to cooperate with the companion blade to define an obtuse included angle therebetween.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint in accordance with the present disclosure for use on a passenger seat in a vehicle, with portions of a fabric covering broken away, showing a juvenile seat comprising a hollow seat shell including a seat bottom and a seat back extending upwardly from the seat bottom and a rigidifying truss (shown diagrammatically) mounted in an interior region of the hollow seat shell and coupled to the hollow seat shell to rigidify the juvenile seat and also showing an energy-dissipation system comprising air-filled ride-down pads mounted on a head cradle of an adjustable headrest included in the juvenile seat and mounted for up-and-down movement on the seat back;

FIG. 2 is a perspective view similar to FIG. 1 with portions broken away to reveal an illustrative four-part rigidifying truss anchored to the hollow seat shell and configured (as shown in more detail in FIG. 4) to include J-shaped first and second stiffener beams, a lower beam stabilizer arranged to lie in a cavity formed in the seat bottom and extend laterally between lower portions of the first and second stiffener beams, and an upper beam stabilizer arranged to lie in a cavity formed in the seat back and extend laterally between upper portions of the first and second stiffener beams;

FIG. 3A is on enlarged side elevation view of the J-shaped first stiffener beam shown on the right side of FIG. 3;

FIG. 3B is a front elevation view of the J-shaped first stiffener beam of FIG. 3A;

FIG. 3C is a top plan view of the J-shaped first stiffener beam of FIG. 3A;

FIG. 4 is an enlarged view of the rigidifying truss shown in FIG. 2 before it is mounted in the interior region formed in the hollow seat shell;

FIG. 5 is an enlarged sectional view taken along line 5-5 of FIG. 4 showing a fastener coupled to each of (1) an upper portion of the first stiffener beam and (2) the upper beam stabilizer and showing that the upper beam stabilizer includes an upper pin that extends into a pin-receiving chamber formed in an upper pin mount included in the first stiffener beam and that the fastener is coupled to the upper pin mount and to the upper pin;

FIG. 6 is an enlarged sectional view taken along line 6-6 of FIG. 4 showing a fastener coupled to each of (1) a lower portion of the first stiffener beam and (2) the lower beam stabilizer and showing that the lower beam stabilizer includes a lower pin that extends into a pin-receiving chamber formed in a lower pin mount included in the first stiffener beam and that the fastener is coupled to the lower pin mount and to the lower pin;

FIG. 10 is a diagrammatic perspective view showing several components included in the child restraint of FIGS. 1, 2, and 7 and suggesting that loads generated by movement of a child seated and harnessed on the juvenile seat will be transferred by the child-restraint harness, slidable cradle-retainer unit, and the bottom shell portion of the hollow seat shell to the first and second stiffener beams included in the rigidifying truss.

DETAILED DESCRIPTION

Figure 3:
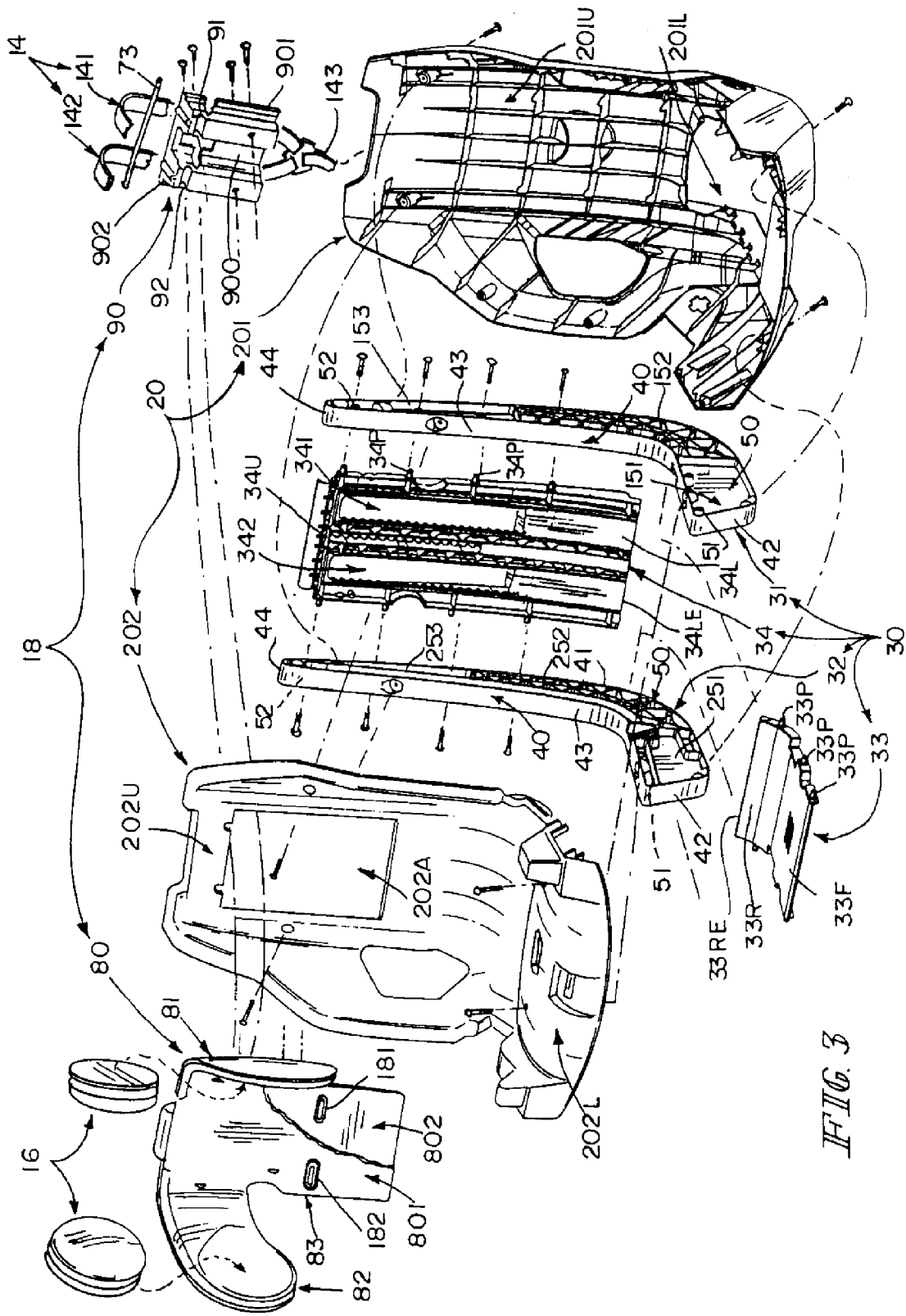
FIG. 3 is an exploded perspective assembly view showing many of the components included in the child restraint of FIGS. 1 and 2 and showing the two J-shaped stiffener beams that mate with the lower and upper beam stabilizers to form the rigidifying truss and separate top and bottom shell portions that can be mated to form the hollow seat shell surrounding the rigidifying truss and showing (on the far right) a slidable cradle-retainer unit included in the adjustable headrest (and coupled to a child-restraint harness) and configured to be mounted on a rearwardly facing surface of the seat back as suggested in FIGS. 7-10 and fastened to the head cradle to move up and down therewith relative to the seat back of the hollow seat shell.

An illustrative child restraint 10 comprises a juvenile seat 12, a child-restraint harness 14, and an energy-dissipation system 16 as suggested in FIGS. 1, 3, and 10. In illustrative embodiments, juvenile seat 12 includes a hollow seat shell 20 and a rigidifying truss 30 located inside hollow seat shell 20 as suggested diagrammatically in FIG. 1 and illustratively in FIGS. 2, 3, 7, and 10. Rigidifying truss 30 includes first and second stiffener beams 31, 32, a lower beam stabilizer 33 located between and coupled to lower portions 31L, 32L of first and second stiffener beams 31, 32, and an upper beam stabilizer 34 located between and coupled to upper portions 31U, 32U of first and second stiffener beams 31, 32 as suggested in FIGS. 2-4.

Hollow seat shell 20 includes a seat bottom 21 and a seat back 22 extending upwardly from seat bottom 21 as shown, for example, in FIGS. 1 and 2. Seat back 22 cooperates with seat bottom 21 to define an interior region 23 containing rigidifying truss 30 as suggested in FIGS. 1 and 2. Rigidifying truss 30 is coupled to seat bottom and back 21, 22 as suggested in FIG. 3 to lie in a stationary position in interior region 23 of hollow seat shell 20 as suggested in FIGS. 2, 7, and 10.

Hollow seat shell 20 includes a bottom shell portion 201 and a top shell portion 202 in illustrative embodiments as suggested in FIGS. 1 and 3. Top shell portion 202 is coupled to bottom shell portion 201 to form interior region 23 therebetween. A bottom cavity 23L of interior region 23 is formed in seat bottom 21 when bottom and top shell portions 201, 202 are mated. A back cavity 23U of interior region 23 is formed in seat back 22 to communicate with bottom cavity 23L and to provide a space large enough to contain rigidifying truss 30 therein when bottom and top shell portions 201, 202 are mated.

Rigidifying truss 30 is a modular component configured to be mounted in interior region 23 of hollow seat shell 20 to rigidify seat shell 20 and is shown, for example, in FIG. 4. First and second stiffener beams 31, 32 are arranged to lie in laterally spaced-apart relation to one another in interior region 23. Lower beam stabilizer 33 is arranged to interconnect lower portions 31L, 32L of first and second stiffener beams 31, 32 to retain those lower portions 31L, 32L in fixed relation to one another. Upper beam stabilizer 34 is arranged to interconnect upper portions 31U, 32U of first and second stiffener beams 31, 32 to retain those upper portions 31U, 32U in fixed relation to one another and to lower portions 31L, 32L of first and second stiffener beams 31, 32. In an illustrative embodiment, each of truss components 31-34 is made of a glass-filled polypropylene material while bottom and top shell portions 201, 202 are made of a polypropylene material.

Once rigidifying truss 30 is placed between bottom and top shell portions 201, 202 and coupled to bottom shell portion 201 and top shell portion 202 is coupled to bottom shell portion 201, then rigidifying truss 30 is retained in interior region 23 of the two-part seat shell 20 to rigidify seat shell 20. As suggested in FIG. 2, lower beam stabilizer 33 is located in bottom cavity 23L of interior region 23 formed in seat bottom 21 and upper beam stabilizer 34 is located in back cavity 23U of interior region 23 formed in seat back 22.

Each of first and second stiffener beams 31, 32 is substantially J-shaped to resemble a hockey stick as shown, for example, in FIG. 3. Lower portions 31L, 32L of stiffener beams 31, 32 lie in bottom cavity 23L while upper portions 31U, 32U of stiffener beams 31, 32 lie in back cavity 23U as suggested in FIG. 2.

The lower portion 31L, 32L of each of first and second stiffener beams 31, 32 is a forwardly and generally horizontally extending blade having an inwardly facing side edge mating with an outwardly facing edge of lower beam stabilizer 33 in an illustrative embodiment. The upper portion 31U, 32U of each of first and second stiffener beams 31, 32 is an upwardly extending handle coupled to a rear end of a companion blade and arranged to cooperate with the companion blade to define an obtuse included angle 100 of about 100° therebetween as suggested in FIG. 3A.

Each of first and second stiffener beams 31, 32 includes a perimeter flange 40 and a rigidifying structure 50. Perimeter flange 40 is formed to include an interior space 40I bounded by perimeter flange 40 as suggested in FIG. 3A. Rigidifying structure 50 is located in interior space 40I and coupled to perimeter flange 40.

Each perimeter flange 40 includes a J-shaped topside wall 43 arranged to extend alongside of lower beam stabilizer 33 and upper beam stabilizer 34, a J-shaped underside wall 41 arranged to lie in spaced-apart relation to J-shaped topside wall 43 and a front wall 42 arranged to interconnect forward ends of each of J-shaped topside and underside walls 43, 41 as suggested in FIG. 3. In illustrative embodiments, each perimeter flange 40 also includes a peak wall 44 arranged to interconnect opposite rearward ends of each of J-shaped topside and underside walls 43, 41 as suggested in FIGS. 2 and 3. In illustrative embodiments, front wall 42 is substantially flat and cooperates with a flat front portion 43F of J-shaped topside wall 43 to define an acute included angle 65 of about 65° therebetween and with a flat front portion 41F of J-shaped underside wall 41 to define an obtuse included angle 110 of about 110° therebetween as suggested in FIG. 3A.

Hollow seat shell 20 includes a bottom shell portion 201 and a top shell portion 202 as suggested in FIGS. 1-3. Top shell portion 202 is coupled to bottom shell portion 201 to form bottom and back cavities 23L, 23U of interior region 23 therebetween as suggested in FIG. 2. The J-shaped underside wall 41 of each stiffener beam 31, 32 mates with bottom shell portion 201 to cause rigidifying truss 30 to rigidify bottom shell portion 201. It is within the scope of this disclosure to mount top shell portions of various shapes and configurations on a rigidified foundation comprising bottom shell portion 201 and rigidifying truss 30. It is also within the scope of this disclosure to vary the shape and configuration of bottom shell portion 201 somewhat to match and mate with a selected companion top shell portion. Rigidifying truss 30 can be used to rigidify a wide variety of hollow seat shells in accordance with the present disclosure.

Rigidifying structure 50 of first stiffener beam 31 includes upright first bottom and top plates 151, 153 and a first stiffener-beam internal truss system 152 in an illustrative embodiment as shown, for example, in FIGS. 3 and 3A. Upright first bottom plate 151 is located in bottom cavity 23L in seat bottom 21 and coupled to each of J-shaped topside and underside walls 43, 41 of first stiffener beam 31. Upright first top plate 153 is located in back cavity 23U of seat back 22 and coupled to each of J-shaped topside and underside walls 43, 41 of first stiffener beam 31. First stiffener-beam internal truss system 152 is arranged to interconnect upright first bottom and top plates 151, 153 and extend into bottom and back cavities 23L, 23U formed in hollow seat shell 20 as suggested in FIG. 2.

Rigidifying structure 50 of second stiffener beam 32 likewise includes upright second bottom and top plates 251, 253 and a second stiffener-beam internal truss system 252 in an illustrative embodiment as shown, for example, in FIG. 3. Upright second bottom plate 251 is located in bottom cavity 23L in seat bottom 21 and coupled to each of J-shaped topside and underside walls 43, 41 of second stiffener beam 32. Upright second top plate 253 is located in back cavity 23U of seat back 22 and coupled to each of J-shaped topside and underside walls 43, 41 of second stiffener beam 32. Second stiffener-beam internal truss system 252 is arranged to interconnect upright second top and bottom plates 251, 253 and extend into bottom and back cavities 23L, 23U formed in hollow seat shell 20 as suggested in FIG. 2.

Lower beam stabilizer 33 includes a front panel 33F and a rear panel 33R as shown, for example, in FIGS. 3 and 4. Front panel 33F is arranged to lie in a substantially horizontal plane between upright first and second bottom plates 151, 251 of first and second stiffener beams 31, 32 as suggested in FIG. 4. Rear panel 33R is appended to front panel 33F and arranged to extend upwardly from front panel 33F in a direction toward upper beam stabilizer 34 and to lie between first and second stiffener-beam internal truss systems 152, 252 as also suggested in FIG. 4.

Rear panel 33R of lower beam stabilizer 33 is curved and formed to include a concave surface arranged to face toward a child seated on seat bottom 21 of juvenile seat 12. Rear panel 33R of lower beam stabilizer 33 terminates at a rear edge 33RE that is arranged to extend between first and second stiffener beams 31, 32 as suggested in FIG. 4. Upper beam stabilizer 34 includes a lower edge 34LE that is arranged to extend between first and second stiffener beams 31, 32 and mate with rear edge 33RE of rear panel 33R of lower beam stabilizer 33 as suggested in FIG. 4.

Upper beam stabilizer 34 includes an upper panel 34U and a lower panel 34L as shown for example in FIGS. 3 and 4. Upper panel 34U is formed to include a pair of upwardly extending and laterally spaced-apart belt-travel channels 341, 342 as shown, for example, in FIGS. 2-4. Upper panel 34U is arranged to lie between upright first and second top plates 153, 253 of first and second stiffener beams 31, 32 as suggested in FIG. 4. Lower panel 34L is arranged to extend downwardly from upper panel 34U toward lower beam stabilizer 33. Lower panel 34L is arranged to lie between first and second stiffener-beam internal truss systems 152, 252. Each of the belt-travel channels 341, 342 is configured to provide means for receiving therein a shoulder belt 141, 142 included in a child-restraint harness 14 coupled to juvenile seat 12 as suggested in FIGS. 7 and 10.

Hollow seat shell 20 includes a bottom shell portion 201 and a top shell portion 202 coupled to bottom shell portion 201 to form bottom and back cavities 23L, 23U of interior region 23 therebetween. The external shape and configuration of bottom and top shell portions 201, 202 can be varied within the scope of this disclosure to suit various consumer needs and preferences while the hollow seat shell 20 defined by mating engagement of bottom and top shell portions 201, 202 is rigidified by a common rigidifying truss 30 mounted in interior region 23 of hollow seat shell 20.

Bottom shell portion 201 includes a bottom frame 201L and a back frame 201U as suggested in FIG. 3 Bottom frame 201L is coupled to lower portions 31L, 32L of first and second stiffener beams 31, 32 to rigidify seat bottom 21 of hollow seat shell 20. Back frame 201U is coupled to upper portions 31L, 32L of first and second stiffener beams 31, 32 to rigidify seat back 22 of the hollow seat shell 20.

Top shell portion 202 includes a seat pad 202L and a backrest 202U as suggested in FIG. 3. Seat pad 202L is arranged to lie in spaced-apart relation to bottom frame 201L to locate lower portions 31L, 32L of first and second stiffener beams 31, 32 therebetween as suggested in FIG. 11. Backrest 202U is arranged to lie in spaced-apart relation to back frame 201U to locate upper portions 31U, 32U of the first and second stiffener beams 31, 32 therebetween as suggested in FIG. 11 and coupled to upper portions 31U, 32U of first and second stiffener beams 31, 32 to rigidify seat back 22 of hollow seat shell 20.

Upright first bottom and top plates 151, 153 of first stiffener beam 31 are arranged to lie in a substantially vertical reference plane P1 as suggested in FIGS. 4-6. Rigidifying structure 35 of first stiffener beam 31 has a lateral thickness 35T that is greater than a lateral thickness 15IT of each of upright first top and bottom plates 151, 153 as suggested in FIGS. 4-6. Rigidifying structure 35 of first stiffener beam 31 has a lateral thickness 35T (see first stiffener-beam internal truss 152) that is about equal to a lateral thickness 40T of perimeter flange 40 of first stiffener beam 31 as suggested in FIG. 4

Rigidifying structure 50 of first stiffener beam 31 further includes a lower pin mount 51 formed to include a pin-receiving chamber 54 as suggested in FIGS. 4-6. Lower pin mount 51 is coupled to upright first bottom plate 151 at an aperture 55 formed in upright first bottom plate 151 to provide an opening into pin-receiving chamber 54 as suggested in FIG. 6.

Lower beam stabilizer 33 includes a front panel 33F and several spaced-apart lower panel-support pins 33P as suggested in FIGS. 3 and 6. Front panel 33F is arranged to lie in a substantially horizontal plane between first and second stiffener beams 31, 32. Each lower panel-support pin 33P is coupled to front panel 33F and arranged to extend outwardly away from front panel 33F through the opening and into pin-receiving chamber 54 of a companion of lower pin mount 51 as suggested in FIG. 6. Lower beam stabilizer 33 further includes a lower fastener 56 coupled to lower pin mount 51 and to lower panel-support pin 33P to anchor lower beam stabilizer 33 to rigidifying structure 50 of first stiffener beam 31.

Rigidifying structure 50 of first stiffener beam 31 further includes an upper pin mount 52 formed to include a pin-receiving chamber 57 as suggested in FIGS. 4 and 5. Upper pin mount 52 is coupled to upright second top plate 152 at an aperture 58 formed in upright first top plate 152 to provide an opening into pin-receiving chamber 57 as suggested in FIG. 57 as suggested in FIG. 5.

Upper beam stabilizer 34 includes an upper panel 34U and second upper panel-support pins 34P. Upper panel 34U is arranged to lie between first and second stiffener beams 31, 32. Each upper panel-support pin 34P is coupled to upper panel 34U and arranged to extend outwardly away from upper panel 34U through the opening and into pin-receiving chamber 57 of a companion upper pin mount 52 as suggested in FIG. 5. Upper beam stabilizer 34 further includes an upper fastener 59 coupled to upper pin mount 52 and to upper panel-support pin 34P to anchor upper beam stabilizer 34 to rigidifying structure 59 of first stiffener beam 31.

Second stiffener beam 32 is similar to first stiffener beam 31 as suggested in FIGS. 3 and 4. Lower portion 32L of second stiffener beam 32 includes a lower pin mount 51 formed to include a pin-receiving chamber 54. Upper portion 32U of second stiffener beam 32 includes an upper pin mount 52 formed to include a pin-receiving chamber 57.

Juvenile seat 12 further includes an adjustable headrest 18 mounted for up-and-down movement on seat back 22 above seat bottom 21 and a headrest-height controller 19 configured and arranged to adjust the height of headrest 18 above seat bottom 21. Headrest-height controller 19 includes a headrest lock 70 and a headrest-lock release 71.

Headrest lock 70 includes a rod receiver 72 and a headrest-retainer rod 73 as suggested in FIGS. 7-10. Rod receiver 72 is coupled to upper beam stabilizer 34 as suggested in FIG. 7. Headrest-retainer rod 73 is coupled to headrest-lock release 71 to move therewith relative to rod receiver 72 and upper beam stabilizer 34 under the control of a caregiver to free headrest 18 to be raised and lowered relative to seat back 22.

Rod receiver 72 is coupled to a rear portion of upper panel 340 of upper beam stabilizer 34 and arranged to extend away from backrest 202U of top shell portion 202 as suggested in FIG. 3. Rod receiver 72 is formed to include a series of rod-receiving notches 75 having openings facing away from backrest 202U of top shell portion 202 and toward back frame 201U of bottom shell portion 201 as suggested in FIG. 3. Each rod-receiving notch 75 is located at a different elevation above seat bottom 21 as suggested in FIG. 2.

Headrest-retainer rod 73 is arranged to move relative to rod receiver 72 between a locked position engaging a selected first of rod-receiving notches 75 of rod receiver 72 to retain headrest 18 in a selected position on seat back 22 to establish the elevation of headrest 18 above seat bottom 21 and an unlocked position disengaging rod-receiving notches 75 formed in rod receiver 72 to free headrest 18 for up-and-down movement relative to backrest to assume a different selected fixed position on seat back 22 associated with a selected second of rod-receiving notches 75 to establish a new elevation of headrest 18 above seat bottom 21. Headrest-lock release 71 is configured to be operated by a caregiver to move headrest-retainer rod 73 toward and away from rod-receiving notches 75.

Figure 7:
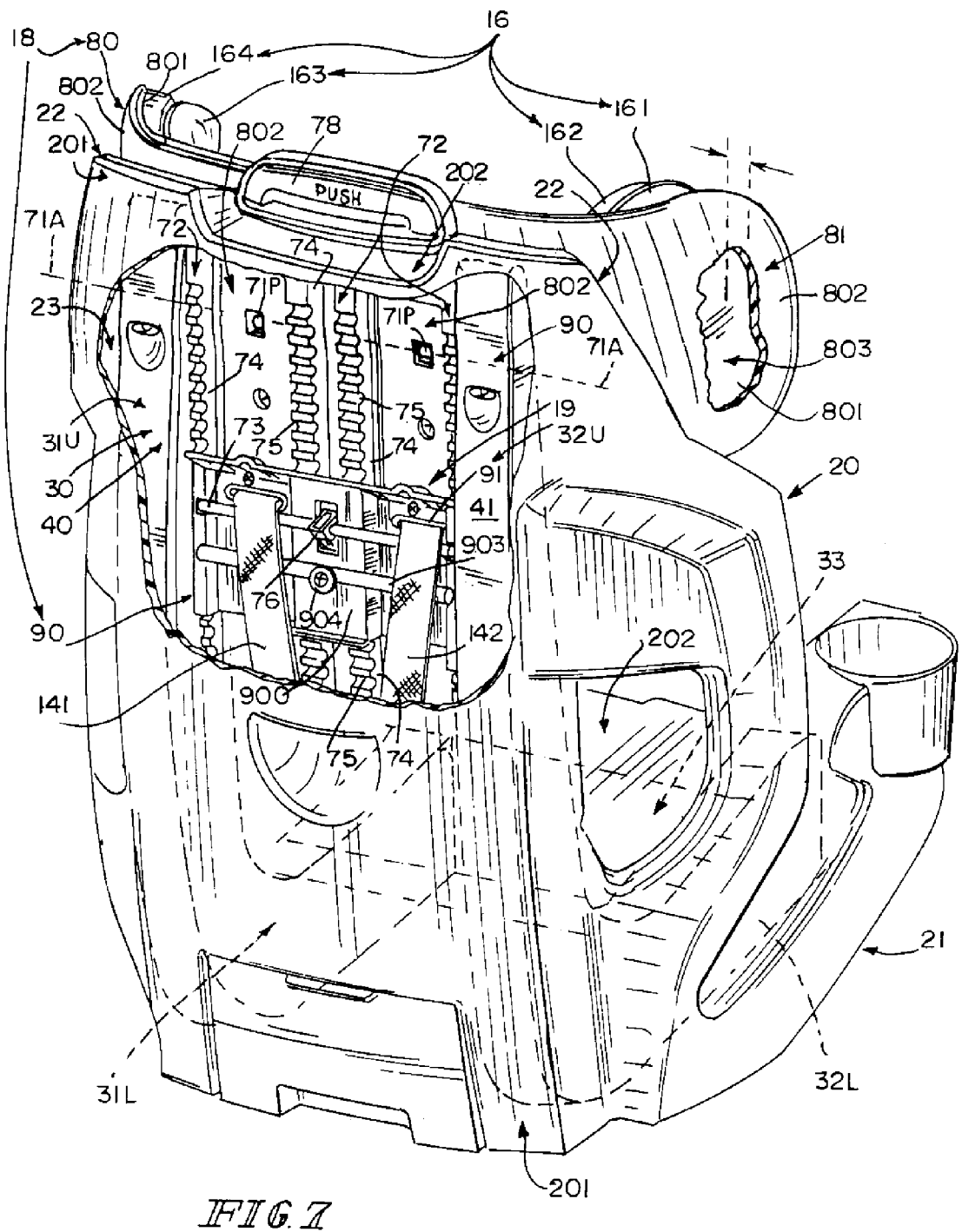
FIG. 7 is an enlarged rear view of the child restraint of FIGS. 1 and 2, with a portion of the bottom shell portion removed to show a portion of the slidable cradle-retainer unit of the headrest coupled to first and second shoulder belts included in the child-restraint harness and mounted for up-and-down movement on the upper beam stabilizer of the rigidifying truss during movement of the headrest relative to the hollow seat shell.
Figure 9:
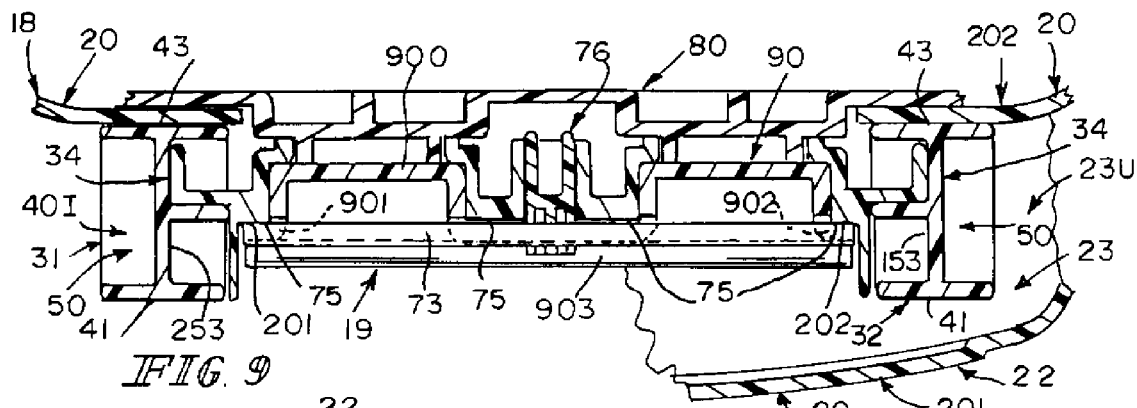
FIG. 9 is a sectional view taken along line 9-9 of FIG. 8 showing the location of the slidable cradle-retainer unit between the first and second stiffener beams and showing mating engagement of the slidable cradle-retainer unit with the left and right load-receiver rails included in the upper beam stabilizer.
Figure 11:
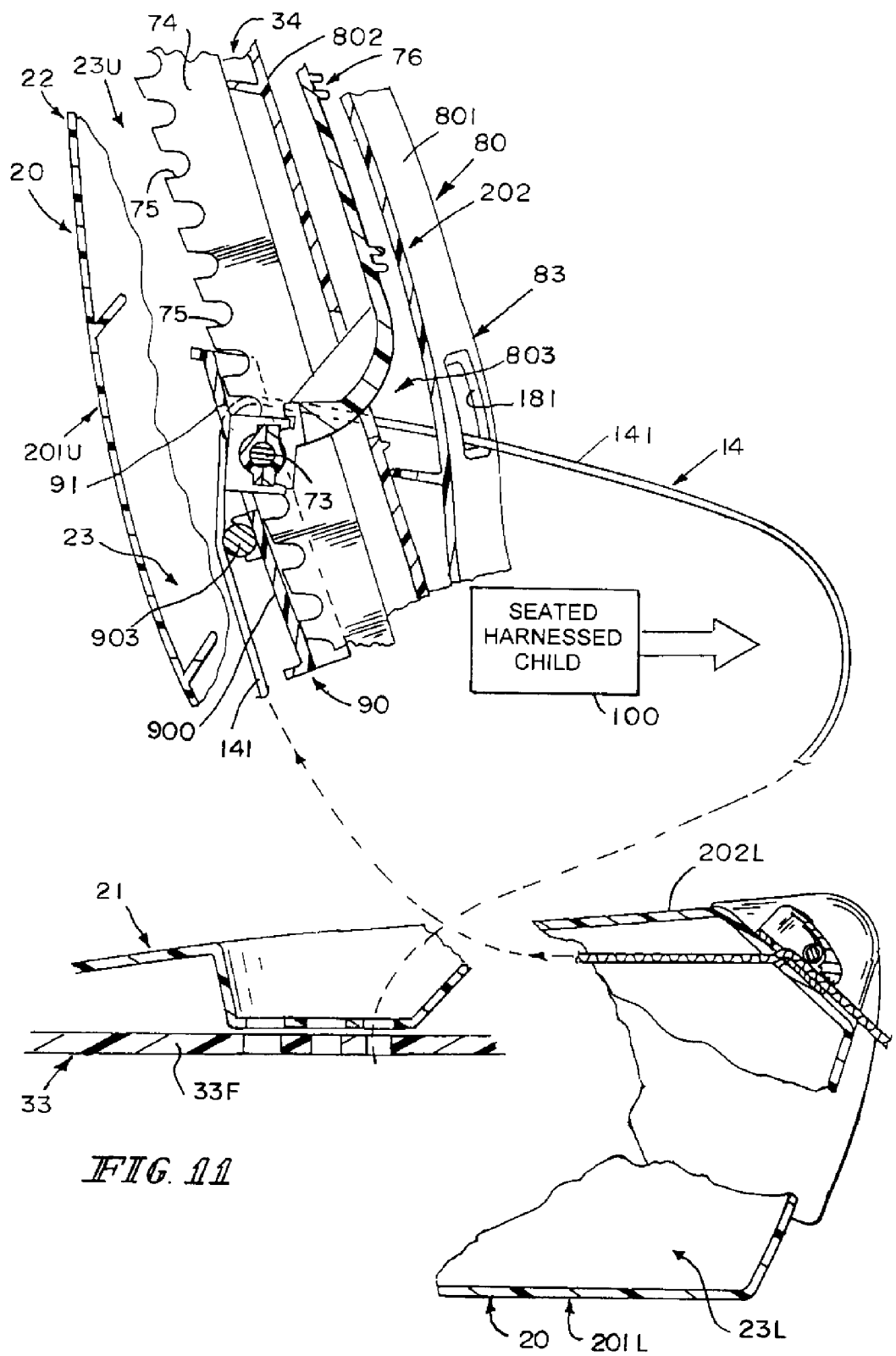
FIG. 11 is an enlarged partial sectional view taken along line 11-11 of FIG. 1, with portions broken away to show portions of the rigidifying truss located in the back and bottom cavities cooperating to define the interior region of the hollow seat shell between the top and bottom seat shell portions that are mated to one another to form the hollow seat shell.

Headrest-lock release 71 includes a pivot mount 71P coupled to rear plate 802 of headrest 18 and a release lever 76 as suggested in FIGS. 7 and 11. Release lever 76 is mounted for movement on and relative to headrest 18 about pivot axis 71A in response to application of a force to a push handle 78 coupled to the release lever 76 by a caregiver to move headrest-retainer rod 73 in a direction away from the rear portion of upper panel 34U of upper beam stabilizer 34 and relative to rod receiver 72 from the locked position to the unlocked position.

As suggested in FIGS. 1, 3, 7, and 10, headrest 18 includes a head cradle 80 and a slidable cradle-retainer plate 90. Cradle-retainer plate 90 is coupled to head cradle 80 to move therewith relative to seat back 22 and to retain head cradle 80 in tethered relation to seat back 22 while allowing up-and-down movement of head cradle 80 relative to seat back 22. In an illustrative embodiment, head cradle 80 includes a front plate 801 coupled to a rear plate 802 to form an open space 803 therebetween as suggested in FIG. 7.

Upper panel 34U of upper beam stiffener 34 is formed to include a pair of upwardly extending and laterally spaced-apart belt-travel channels 341, 342 shown, for example, in FIGS. 2, 3, and 4. These belt-travel channels 341, 342 are provided so that shoulder belts 141, 142 in child-restraint harness 14 can pass between front and rear sides of seat shell 20. Headrest 18 is aligned with seat back 22 so that belt-receiving slots 181, 182 formed in head cradle 80 and belt-receiving slots 91, 92 formed in slidable cradle-retainer plate 90 of headrest 18 are always aligned with belt-travel channels 341, 342 formed in upper panel 34U of upper beam stabilizer 34 regardless of the position of headrest 18 on seat back 22. Backrest 202U of top shell portion 202 is formed to include an aperture 202A aligned to communicate with belt-travel channel 341, 342 as suggested in FIGS. 2 and 3.

A first shoulder belt 141 included in child-restraint harness 14 is arranged to extend through first belt-travel channel 341 as suggested in FIGS. 1, 2 and 10. First shoulder belt 141 is also arranged to extend through a first shoulder belt-receiving slot 181 formed in head cradle 80 of headrest 18 as suggested in FIG. 5 and through a first shoulder belt-receiving slot 91 formed in slidable cradle-retainer plate 90 of headrest 18 as suggested in FIGS. 7, 8, and 10.

A second shoulder belt 142 included in child-restraint harness 14 is arranged to extend through second belt-travel channel 342 as suggested in FIGS. 1, 2, and 10. Second shoulder belt 142 is also arranged to extend through a second shoulder belt-receiving slot 182 formed in head cradle 80 of headrest 18 as suggested in FIGS. 1 and 10 and through a second shoulder belt-receiving slot 92 formed in slidable cradle-retainer plate 90 of headrest 18 as suggested in FIGS. 7, 8, and 10.

Head cradle 80 of headrest 18 includes a harness-control unit 83 formed to include first and second belt-receiving slots 181, 182. Head cradle 80 also includes a first side wing 81 coupled to one side of harness-control unit 83 and a second side wing 82 coupled to another side of harness-control unit 83 as suggested in FIG. 3. Illustratively, a head of a child seated on juvenile seat 12 is positioned to lie between first and second side wings 81, 82 on harness-control unit 83.

Headrest 18 is mounted for up-and-down movement on seat back 22 of seat shell 20. The first and second shoulder belt-receiving slots 181, 182 of harness-control unit 83 of head cradle 80 and the first and second shoulder belt-receiving slots 91, 92 formed in slidable cradle-retainer plate 90 are aligned with their companion belt-travel channels 431, 432 formed in upper beam stiffener 34 of rigidifying as suggested in FIG. 10. Shoulder belt-receiving slots 181, 182 formed in head cradle 80 and shoulder belt-receiving slots 91, 92 formed in slidable cradle-retainer plate 90 operate to keep shoulder belts 141, 42 positioned at an appropriate height that corresponds to the vertical position of headrest 18 relative to seat back 22.

Child-restraint harness 14 is used to restrain a child sitting on seat shell 20. Child-restraint harness 14 in an illustrative embodiment is configured to include shoulder belts 141, 142, a crotch belt 143, and thigh belts (not shown). Belt-travel channels 431, 432 formed in rigidifying truss 30 allow shoulder belts 141, 142 to move with headrest 18 along the length of seat back 22 between raised and lowered positions.

Headrest-height controller 19 is included in juvenile seat 12 and is shown diagrammatically in FIG. 1. Headrest-height controller 19 is configured and arranged to vary the height of headrest 18 above seat bottom 21. An illustrative headrest-height controller 19 includes a headrest lock 70 and a headrest-lock release 71.

Headrest lock 70 comprises a movable headrest-retainer rod 73 and one or more rearwardly extending notched plates 74 coupled to upper panel 34U of upper beam stabilizer 34 as suggested in FIG. 7. Each notched plate 74 is formed to include a series of companion rod-receiving notches 75 as suggested in FIG. 7.

Headrest-lock release 71 comprises a movable PUSH handle 78 and suitable linkage means 76 interconnecting handle 78 and headrest-retainer rod 73 for selectively moving headrest-retainer rod 73 away from upper beam stabilizer 34 of rigidifying truss 30 (at the option of a caregiver) to disengage rod-receiving notches 75 to free headrest 18 to be moved up or down on seat back 22 between raised and lowered positions in response to movement of PUSH handle 78 relative to seat back 22 of seat shell 20 by a caregiver. Whenever headrest-retainer rod 73 is deposited by headrest-lock release 71 into rod-receiving notches 75, headrest 18 is retained in a selected stationary position above seat bottom 21 of seat shell 20.

Reference is hereby made to U.S. application Ser. No. 12/726,128, filed on Mar. 17, 2010, which reference is hereby incorporated in its entirety therein, for disclosures relating to headrest-height controllers. In an illustrative process, a caregiver can operate headrest-height controller 19 to unlock and lock headrest 18 so as to change the height of headrest 18 above seat bottom 21. A caregiver can squeeze or otherwise move PUSH handle 78 toward seat shell 20 to cause linkage means 76 to move headrest-retainer rod 73 relative to notched plates 74 and cradle-retainer plate 90 to disengage notches 75 formed in notched plates 74. Then the caregiver can lift headrest 18 to a higher position on seat back 22 or drop headrest 18 to a lower position on seat back 22 and then release PUSH handle 78 to allow linkage means 76 to move (under, e.g., a spring force) to place headrest-retainer rod 73 in another of the notches 75 corresponding to a selected height above seat bottom 21.

The slidable cradle-retainer plate 90 of headrest 18 is configured and arranged to assist in transferring loads applied to child-restraint harness 14 by a child 100 seated in juvenile seat 12 to first and second stiffener beams 31, 32 of rigidifying truss 30 of juvenile seat 12 during exposure of a vehicle 101 having a passenger seat 102 carrying juvenile seat 12 to an external impact force 103 as suggested in FIG. 10. During such an event, relative movement of the seated harnessed child 100 and juvenile seat 12 causes, in series (1) a load L1 to be applied by child 100 to first and second shoulder belts 141, 142; (2) a load L2 to be applied by belts 141, 142 to slidable cradle-retainer plate 90 of headrest 18; (3) a load L3 to be applied by slidable cradle-retainer plate 90 to seat shell 20; and (4) a load L4 to be applied by seat shell 20 to first and second stiffener beams 131, 32 of rigidifying truss 30 as suggested diagrammatically in FIG. 10. As such, rigidifying truss 30 (e.g., first and second stiffener beams 31, 32, lower beam stabilizer 33, and upper beam stabilizer 34) carry loads applied to juvenile seat 12 during exposure of juvenile seat 12 to an external impact force 103.

As shown in FIG. 3, slidable cradle-retainer plate 90 of headrest 18 includes a central bed 900 formed to include first and second belt-receiving slots 91, 92 and first and second load-transfer flanges 901, 902. First load-transfer flange 901 is coupled to one side of central bed 900 and arranged to mate with and slide on a complementary companion first load-transfer rail 201 included in seat shell 20 as suggested in FIGS. 7-9. Second load-transfer flange 902 is coupled to an opposite side of central bed 900 and arranged to mate with and slide on a complementary companion second load-transfer rail 202 included in seat shell 20 as suggested in FIGS. 7-9.

Figure 8:
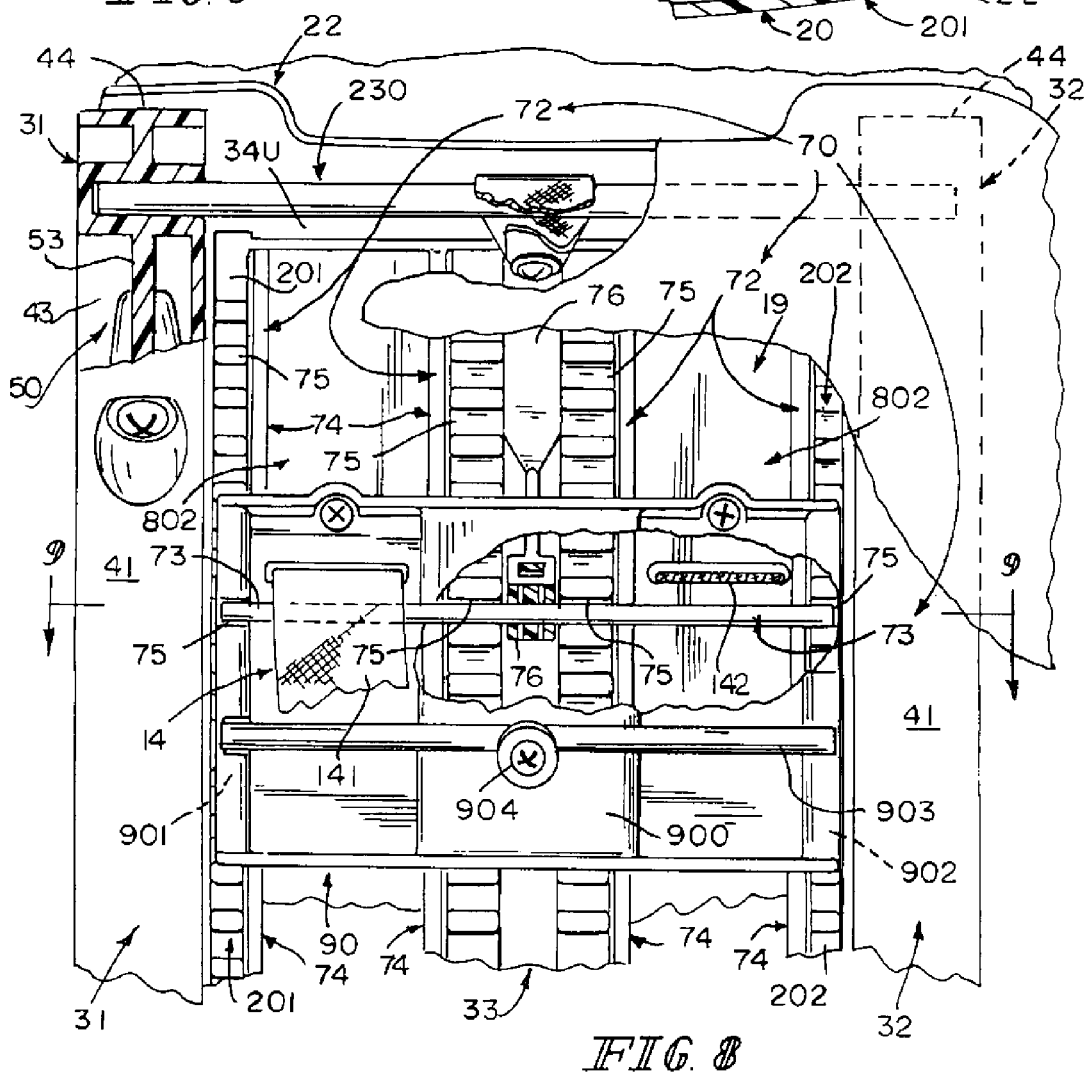
FIG. 8 is an enlarged rear elevation view of a portion of the child restraint of FIGS. 1, 2, and 7 showing that the slidable cradle-retainer unit included in the headrest is formed to include a pair of spaced-apart shoulder belt-receiving belt-travel channels and is mounted for up-and-down sliding movement on left and right load-receiver rails provided on left-side and right-side edges of the upper beam stabilizer support in a unit-receiver channel formed between upper portions of the first and second stiffener beams.

A reinforcing bar 903 is coupled to central bed 900 of cradle-retainer plate 90 to move therewith as shown, for example, in FIGS. 7 and 8. Reinforcing bar 903 is arranged to lie in spaced-apart parallel relation to headrest-retainer rod 73 as suggested in FIG. 8. Reinforcing bar 903 is held in a fixed position on central bed 900 by a fastener 904 coupled to central bed 900 and to reinforcing bar 903.

The invention claimed is:

1. A child restraint comprising:
a juvenile seat including a hollow seat shell having a seat bottom and a seat back extending upwardly from the seat bottom and cooperating with the seat bottom to define an interior region of the hollow seat shell and a rigidifying truss located in the interior region of the hollow seat shell and coupled to the seat bottom and to the seat back to lie in a stationary position in the interior region,
wherein the rigidifying truss includes
a first stiffener beam,
a second stiffener beam arranged to lie in laterally spaced-apart relation to the first stiffener beam,
a lower beam stabilizer located in a bottom cavity of the interior region formed in the seat bottom and arranged to interconnect lower portions of the first and second stiffener beams to retain those lower portions in fixed relation to one another, and
an upper beam stabilizer located in a back cavity of the interior region formed in the seat back to communicate with the bottom cavity and arranged to interconnect upper portions of the first and second stiffener beams to retain those upper portions in fixed relation to one another and to the lower portions of the first and second stiffener beams,
wherein each of the first and second stiffener beams includes a perimeter flange formed to include an interior space bounded by the perimeter flange and a rigidifying structure located in the interior space and coupled to the perimeter flange and the perimeter flange including a J-shaped topside wall arranged to extend alongside of the lower beam stabilizer and the upper beam stabilizer, a J-shaped underside wall arranged to lie in spaced-apart relation to the J-shaped topside wall, and a front wall arranged to interconnect forward ends of each of the J-shaped topside and underside walls.

2. The child restraint of claim 1, wherein each of the first and second stiffener beams is substantially J-shaped and the lower portion thereof is arranged to lie in the bottom cavity and the upper portion thereof is arranged to lie in the back cavity.

3. The child restraint of claim 2, wherein the lower portion of each of the first and second stiffener beams is a forwardly and generally horizontally extending blade having an inwardly facing side edge mating with an outwardly facing edge of the lower beam stabilizer and the upper portion of each of the first and second stiffener beams is an upwardly extending handle coupled to a rear end of a companion blade and arranged to cooperate with the companion blade to define an obtuse included angle therebetween.

4. The child restraint of claim 1, wherein the hollow seat shell includes a bottom shell portion and a top shell portion coupled to the bottom shell portion to form the bottom and back cavities of the interior region therebetween, and the J-shaped underside wall of each stiffener beam mates with the bottom shell portion to cause the rigidifying truss to rigidify the bottom shell portion.

5. The child restraint of claim 1, wherein the rigidifying structure of the first stiffener beam includes an upright first bottom plate located in the bottom cavity in the seat bottom and coupled to each of the J-shaped topside and underside walls of the first stiffener beam, an upright first top plate located in the back cavity of the seat back and coupled to each of the J-shaped topside and underside walls of the first stiffener beam, and a first stiffener-beam internal truss system arranged to interconnect the upright first bottom and top plates and extend into the bottom and back cavities formed in the hollow seat shell.

6. The child-restraint of claim 5, wherein the rigidifying structure of the second stiffener beam includes an upright second bottom plate located in the bottom cavity in the seat bottom and coupled to each of the J-shaped topside and underside walls of the second stiffener beam, an upright second top plate located in the back cavity of the seat back and coupled to each of the J-shaped topside and underside walls of the first stiffener beam, and a second stiffener-beam internal truss system arranged to interconnect the upright second top and bottom plates and extend into the bottom and back cavities formed in the hollow seat shell, the lower beam stabilizer includes a front panel arranged to lie in a substantially horizontal plane between the upright first and second bottom plates and a rear panel appended to the front panel and arranged to extend upwardly from the front panel in a direction toward the upper beam stabilizer and to lie between the first and second stiffener-beam internal truss systems.

7. The child restraint of claim 6, wherein the rear panel of the lower beam stabilizer is curved and formed to include a concave surface arranged to face toward a child seated on the seat bottom of the juvenile seat.

8. The child restraint of claim 6, wherein the rear panel of the lower beam stabilizer terminates at a rear edge arranged to extend between the first and second stiffener beams and the upper beam stabilizer includes a lower edge arranged to extend between the first and second stiffener beams and mate with the rear edge of the rear panel of the lower beam stabilizer.

9. The child restraint of claim 5, wherein the rigidifying structure of the second stiffener beam includes an upright second bottom plate located in the bottom cavity in the seat bottom and coupled to each of the J-shaped topside and underside walls of the second stiffener beam, an upright second top plate located in the back cavity of the seat back and coupled to each of the J-shaped topside and underside walls of the second stiffener beam, and a second stiffener-beam internal truss system arranged to interconnect the upright second top and bottom plates and extend into the bottom and back cavities formed in the hollow seat shell, the upper beam stabilizer includes an upper panel formed to include a pair of upwardly extending and laterally spaced-apart belt-travel channels and arranged to lie between the upright first and second top plates and a lower panel arranged to extend downwardly from the upper panel toward the lower beam stabilizer and arranged to lie between the first and second stiffener-beam internal truss systems, and each of the belt-travel channels is configured to provide means for receiving therein a shoulder belt included in a child-restraint harness coupled to the juvenile seat.

10. The child restraint of claim 9, wherein the lower beam stabilizer includes a front panel arranged to lie in a substantially horizontal plane between the upright first and second bottom plates and a rear panel appended to the front panel and arranged to extend upwardly from the front panel in a direction toward the upper beam stabilizer and to lie between the first and second stiffener-beam internal truss systems.

11. The child restraint of claim 10, wherein the rear panel of the lower beam stabilizer is curved and formed to include a concave surface arranged to face toward a child seated on the seat bottom of the juvenile seat.

12. The child restraint of claim 10, wherein the rear panel of the lower beam stabilizer terminates at a rear edge arranged to extend between the first and second stiffener beams and the upper beam stabilizer includes a lower edge arranged to extend between the first and second stiffener beams and mate with the rear edge of the rear panel of the lower beam stabilizer.

13. The child restraint of claim 1, wherein the hollow seat shell includes a bottom shell portion and a top shell portion coupled to the bottom shell portion to form the bottom and back cavities of the interior region therebetween, the bottom shell portion includes a bottom flame coupled to the lower portions of the first and second stiffener beams to rigidify the seat bottom of the hollow seat shell and a back flame coupled to the upper portions of the first and second stiffener beams to rigidify the seat back of the hollow seat shell, and the top shell portion includes a seat pad arranged to lie in spaced-apart relation to the bottom flame to locate the lower portions of the first and second stiffener beams therebetween and a backrest arranged to lie in spaced-apart relation to the back flame to locate the upper portions of the first and second stiffener beams therebetween and coupled to the upper portions of the first and second stiffener beams to rigidify the seat back of the hollow seat shell.

14. The child restraint of claim 13, wherein the first stiffener beam includes a perimeter flange formed to include an interior space bounded by the perimeter flange and a rigidifying structure located in the interior space and coupled to the perimeter flange and the perimeter flange is coupled to the bottom and back frames of the bottom shell portion.

15. The child restraint of claim 14, wherein the perimeter flange of the first stiffener beam includes a J-shaped underside wall coupled to the bottom and back frames of the bottom shell portion.

16. The child restraint of claim 14, wherein the rigidifying structure of the first stiffener beam includes an upright first bottom plate located in the bottom cavity in the seat bottom and coupled to the perimeter flange, an upright first top plate located in the back cavity in the seat back and coupled to the perimeter flange, and a first stiffener-beam internal truss system arranged to interconnect the upright first bottom and top plates and extend into the bottom and back cavities formed in the hollow seat shell.

17. The child restraint of claim 16, wherein the upright first bottom and top plates are arranged to lie in a substantially vertical reference plane and the rigidifying structure of the first stiffener beam has a lateral thickness that is greater than a lateral thickness of the upright first top and bottom plates.

18. The child restraint of claim 16, wherein the rigidifying structure of the first stiffener beam has a lateral thickness that is about equal to a lateral thickness of the perimeter flange of the first stiffener beam.

19. The child restraint of claim 16, wherein the rigidifying structure of the first stiffener beam further includes a lower pin mount formed to include a pin-receiving chamber and coupled to the upright first bottom plate at an aperture formed in the upright first bottom plate to provide an opening into the pin-receiving chamber and the lower beam stabilizer includes a front panel arranged to lie in a substantially horizontal plane between the first and second stiffener beams and a lower panel-support pin coupled to the front panel and arranged to extend outwardly away from the front panel through the opening and into the pin-receiving chamber of the lower pin mount.

20. The child restraint of claim 19, wherein the lower beam stabilizer further includes a lower fastener coupled to the lower pin mount and to the lower panel-support pin to anchor the lower beam stabilizer to the rigidifying structure of the first stiffener beam.

21. The child restraint of claim 16, wherein the rigidifying structure of the first stiffener beam further includes an upper pin mount formed to include a pin-receiving chamber and coupled to the upright second top plate at an aperture formed in the upright first top plate to provide an opening into the pin-receiving chamber and the upper beam stabilizer includes an upper panel arranged to lie between the first and second stiffener beams and an upper panel-support pin coupled to the upper panel and arranged to extend outwardly away from the upper panel through the opening and into the pin-receiving chamber of the upper pin mount.

22. The child restraint of claim 21, the upper beam stabilizer further includes an upper fastener coupled to the upper pin mount and to the upper panel-support pin to anchor the upper beam stabilizer to the rigidifying structure of the first stiffener beam.

23. The child restraint of claim 13, wherein the lower portion of the first stiffener beam includes a lower pin mount formed to include a pin-receiving chamber and the lower beam stabilizer includes a front panel arranged to lie in a substantially horizontal plane between the first and second stiffener beams and a lower panel-support pin coupled to the front panel and arranged to extend outwardly away from the front panel into the pin-receiving chamber of the lower pin mount.

24. The child restraint of claim 23, wherein the lower beam stabilizer further includes a lower fastener coupled to the lower pin mount and to the lower panel-support pin to the anchor the lower beam stabilizer to the lower portion of the first stiffener beam.

25. The child restraint of claim 13, wherein the upper portion of the first stiffener beam includes an upper pin mount formed to include a pin-receiving chamber and the upper beam stabilizer includes an upper panel arranged to lie between the first and second stiffener beams and an upper panel-support pin coupled to the upper panel and arranged to extend outwardly away from the upper panel and into the pin-receiving chamber of the upper pin mount.

26. The child restraint of claim 25, wherein the upper beam stabilizer further includes an upper fastener coupled to the upper pin mount and to the upper panel-support pin mount and to the upper panel-support pin to anchor the upper beam stabilizer to the upper portion of the first stiffener beam.

27. The child restraint of claim 13, wherein the lower beam stabilizer includes a front panel arranged to extend between the first and second stiffener beams and to lie in a substantially horizontal plane in a stationary position in the bottom cavity above the bottom frame of the bottom shell portion and below the seat pad of the top shell portion.

28. The child restraint of claim 13, wherein the upper beam stabilizer includes an upper panel arranged to extend between the first and second stiffener beams to lie in a stationary position in the back cavity between the backrest and the back frame.

29. The child restraint of claim 28, wherein the upper panel is formed to include a pair of upwardly extending and laterally spaced-apart belt-travel channels and each of the belt-travel channels is configured to provide means for receiving therein a shoulder belt included in a child-restraint harness coupled to the juvenile seat.

30. The child restraint of claim 28, wherein the juvenile seat further includes an adjustable headrest mounted for up-and-down movement on the seat back above the seat bottom and a headrest-height controller arranged to adjust the height of the headrest above the seat bottom, wherein the headrest-height controller includes a headrest lock and a headrest-lock release, the headrest lock includes a rod receiver coupled to a rear portion of the upper panel and arranged to extend away from the backrest of the top shell portion, the rod receiver is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the seat back to establish the elevation of the headrest above the seat bottom and an unlocked position disengaging rod-receiving notches formed in the rod receiver to free the headrest for up-and-down movement relative to the backrest to assume a different selected fixed position on the seat back associated with a selected second of the rod-receiving notches to establish a new elevation of the headrest above the seat bottom, and wherein the headrest-lock release includes a release lever mounted for movement on and relative to the headrest in response to application of a force to the release lever by a caregiver to move the headrest-retainer rod in a direction away from the rear portion of the upper panel and relative to the rod receiver from the locked position to the unlocked position.

31. A child restraint comprising:
a juvenile seat including a hollow seat shell having a seat bottom and a seat back extending upwardly from the seat bottom and cooperating with the seat bottom to define an interior region of the hollow seat shell and a rigidifying truss located in the interior region of the hollow seat shell and coupled to the seat bottom and to the seat back to lie in a stationary position in the interior region,
wherein the rigidifying truss includes
a first stiffener beam,
a second stiffener beam arranged to lie in laterally spaced-apart relation to the first stiffener beam, and
an upper beam stabilizer located in a back cavity of the interior region formed in the seat back to communicate with the bottom cavity and arranged to interconnect upper portions of the first and second stiffener beams to retain those upper portions in fixed relation to one another and to the lower portions of the first and second stiffener beams, the upper beam stabilizer being formed to include a pair of upwardly extending and laterally spaced-apart belt-travel channels and each of the belt-travel channels is configured to provide means for receiving therein a shoulder belt included in a child-restraint harness coupled to the juvenile seat.

32. The child restraint of claim 31, wherein the juvenile seat further includes an adjustable headrest mounted for up-and-down movement on the seat back above the seat bottom and a headrest-height controller arranged to adjust the height of the headrest above the seat bottom, wherein the headrest-height controller includes a headrest lock and a headrest-lock release, the headrest lock includes a rod receiver coupled to a rear portion of the upper panel and arranged to extend away from the backrest of the top shell portion, the rod receiver is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the seat back to establish the elevation of the headrest above the seat bottom and an unlocked position disengaging rod-receiving notches formed in the rod receiver to free the headrest for up-and-down movement relative to the backrest to assume a different selected fixed position on the seat back associated with a selected second of the rod-receiving notches to establish a new elevation of the headrest above the seat bottom, and wherein the headrest-lock release includes a release lever mounted for movement on and relative to the headrest in response to application of a force to the release lever by a caregiver to move the headrest-retainer rod in a direction away from the rear portion of the upper panel and relative to the rod receiver from the locked position to the unlocked position.

\* \* \* \* \*